Figure 1:
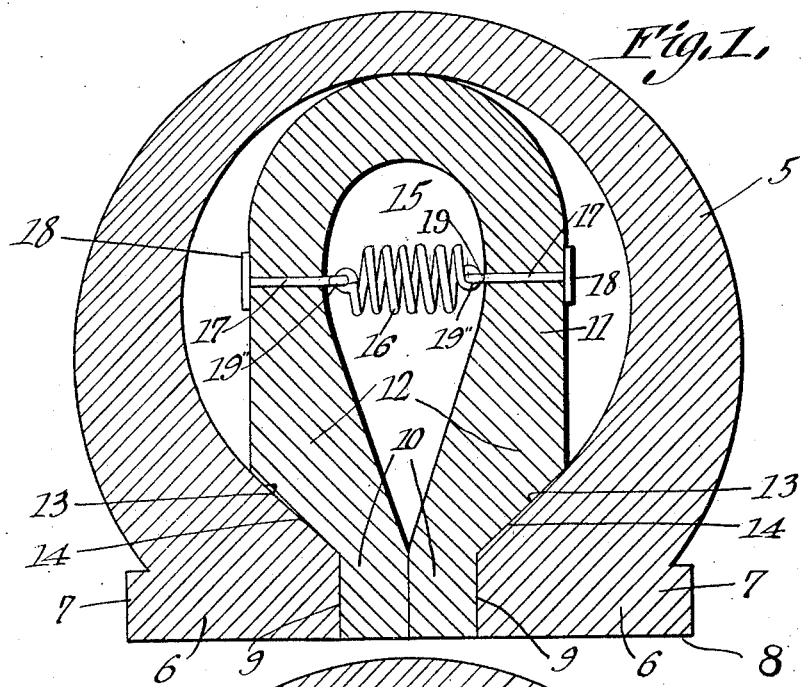

E. E. BULL.
AUTOMOBILE TIRE.
APPLICATION FILED DEC. 5, 1919.

1,358,410.  Patented Nov. 9, 1920.

Inventor
E. E. Bull

UNITED STATES PATENT OFFICE.

EDWARD E. BULL, OF WHITWELL, TENNESSEE.

AUTOMOBILE-TIRE.

1,358,410.  Specification of Letters Patent.  Patented Nov. 9, 1920.

Application filed December 5, 1919. Serial No. 342,646.

*To all whom it may concern:*

Be it known that I, EDWARD E. BULL, a citizen of the United States, residing at Whitwell, in the county of Marion and State of Tennessee, have invented a new and useful Automobile-Tire, of which the following is a specification.

This invention relates to new and useful improvements in cushion tires to be used in connection with motor vehicles of various types, and it is the primary object of the invention to provide a tire of this character which will possess a maximum amount of resiliency.

A further object of the invention is to provide a tire embodying an outer casing of rubber or other suitable material, and an inner casing removably supported within the outer casing, and having means for supporting the side walls of the inner casing in spaced relation with the inner walls of the outer casing, to add resiliency to the construction.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 2:
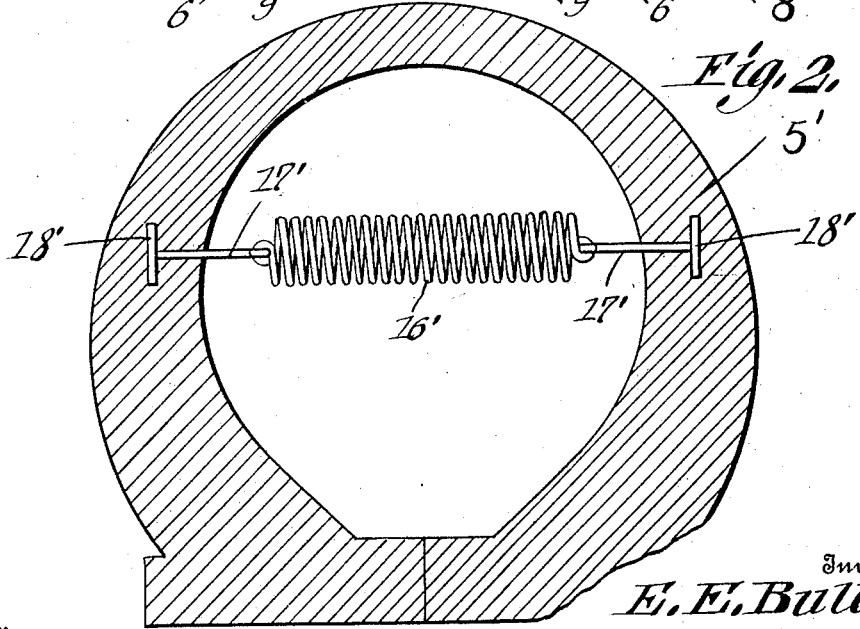

Figure 1 illustrates a transverse sectional view through a cushion tire constructed in accordance with the present invention; and Fig. 2 illustrates a fragmental sectional view of the modified form of the invention.

Referring to the drawing in detail, the reference character 5 designates the outer casing of the tire, which is substantially circular in cross section and includes the relatively thick bead portions 6 presenting the shoulder 7 and a relatively flat rim engaging section 8.

The bead portions 6 are constructed so that the opposed inner side walls 9 thereof will lie in spaced relation with each other, when the device is applied to a rim to provide a clearance for the depending portions 10 forming the ends of the inner section 11 of the tire.

This inner section 11 includes a circular strip of rubber or tire fabric bent upon itself, as shown by Fig. 1 of the drawing, the enlargements 12 formed adjacent the depending portions 10 of the inner casing presenting inclined surfaces 13 contacting with the inner surfaces 14 of the outer casing, so that the direct pressure usually directed to the tread portion of the tire will be exerted or distributed to the enlargements 12 and the bead portions 6 of the lateral casing.

As shown, the outer surfaces of the inner section 11 are constructed so that they will lie in spaced relation with the inner curved surfaces of the outer casing, the inner walls of the inner casing also lying in spaced relation with each other to provide a compartment 15 for housing the metallic springs 16 which are disposed throughout the compartment 15 in spaced relation with each other, the number of springs 16 being determined by the size of the tire and the use for which the tire will be provided.

These metallic springs 16 also lend resiliency to the tire proper, the same being disposed transversely of the tire and being of lengths to permit the ends thereof to lie in spaced relation with the inner walls of the inner section 11 to allow the spring members 16 to expand and contract under the weight of the wheels supporting the same, thus it will be seen that when pressure is exerted to the periphery of the tire, the springs expand, due to the flattening of the tire, which flattening causes the side walls of the inner section to move away from each other, due to the connections of the springs 16 with the walls of the inner section 11.

Disposed within the side walls of the inner section 11, and extending therethrough, are the elongated securing pins 17, each of which is provided with a head 18 adapted to lie in close engagement with the outer surface of the inner section 11, the inner ends of said securing pins 17 extending beyond the inner side walls of the section 11 and provided with hooked portions 19, the hooked portions 19 of the respective securing pins 17 lying in positions directly opposite each other to receive the hooked ends 19″ of the coiled springs.

Thus it will be seen that movement of the side walls of the inner section 11 is transmitted to the coiled springs 16 which restrict such movement, or retard the lateral movements of the side walls of the inner section 11 to cushion the impact caused by the tire meeting obstructions on the surface over which the same is operating.

When the device is used for light work, it may be desirable to eliminate the use of the inner casing 11 and to this end the heads 18' of the securing pins 17' as shown in the modified form of the invention illustrated by Fig. 2 of the drawing, are embedded within the side walls of the casing 5' with the result that the flattening of the tire which produces lateral movement of the side walls thereof, is restricted by the coiled springs 16', associated with the securing pins 17', which coiled springs return the side walls of the tire casing to their normal positions, after the same have moved.

Having thus described the invention, what is claimed is:

1. A cushion tire including an outer casing, an inner section including a strip of flexible material bent upon itself and positioned within the outer casing, the outer lateral walls of the inner section lying in spaced relation with the inner side walls of the outer casing, and means having connection with the walls of the inner section for restricting lateral movement thereof with relation to each other.

2. A cushion tire including an outer casing, an inner section including a strip of flexible material bent upon itself and positioned within the outer casing, the inner section having inclined surfaces adjacent the inner edge thereof, the inclined surfaces contacting with the inner side surfaces of the outer casing, said inner section having a portion thereof contacting with the inner wall of the tread of the outer casing, the outer lateral walls of the inner section being spaced from the inner walls of the outer casing, and means for restricting lateral movement of the side walls of the inner section with relation to each other.

In testimony that I claim the foregoing as my own, I have hereto affixed my signature in the presence of two witnesses.

EDWARD E. BULL.

Witnesses:
M. G. BULL,
LOUELLA BULL.